(12) United States Patent
Premerlani et al.

(10) Patent No.: US 7,633,725 B2
(45) Date of Patent: Dec. 15, 2009

(54) MICRO-ELECTROMECHANICAL SYSTEM BASED SOFT SWITCHING

(75) Inventors: William James Premerlani, Scotia, NY (US); Kanakasabapathi Subramanian, Clifton Park, NY (US); Christopher Keimel, Clifton Park, NY (US); John N. Park, Rexford, NY (US); Ajit Achuthan, Schenectady, NY (US); Wensen Wang, Albany, NY (US); Joshua Isaac Wright, Esperence, NY (US); Kristina Margaret Korosi, Cincinnati, OH (US); Somashekhar Basavaraj, Bangalore (IN)

(73) Assignee: General Electric Company, Niskayuna, NY (US)

( * ) Notice: Subject to any disclaimer, the term of this patent is extended or adjusted under 35 U.S.C. 154(b) by 283 days.

(21) Appl. No.: 11/314,879

(22) Filed: Dec. 20, 2005

(65) Prior Publication Data
US 2007/0139830 A1 Jun. 21, 2007

(51) Int. Cl.
H02H 3/00 (2006.01)
H02H 7/00 (2006.01)
(52) U.S. Cl. .................... 361/8; 361/5; 361/6
(58) Field of Classification Search ............ 361/8, 361/5, 6
See application file for complete search history.

(56) References Cited

U.S. PATENT DOCUMENTS 3,496,409 A 2/1970 Connell
4,010,386 A * 3/1977 Rossell ............... 327/392
4,500,934 A 2/1985 Kinsinger
4,555,603 A * 11/1985 Aoyama ............... 218/143
4,700,256 A 10/1987 Howell
4,723,187 A 2/1988 Howell
4,864,157 A * 9/1989 Dickey ............... 307/135
5,391,930 A * 2/1995 Ohshita et al. ........... 307/98
5,430,597 A 7/1995 Bagepalli et al.
6,545,881 B2 * 4/2003 Preller ............... 363/21.01
6,563,683 B1 * 5/2003 Strumpler ............ 361/93.1
6,738,246 B1 5/2004 Strumpler
6,760,202 B1 7/2004 Meyer et al.
6,768,615 B2 * 7/2004 Liu ..................... 361/2
7,291,986 B2 * 11/2007 Ionescu ............... 315/276
2003/0183838 A1 10/2003 Huang et al.
2005/0146404 A1 7/2005 Yeatman
2005/0146814 A1 7/2005 Sellier et al.
2006/0187688 A1 8/2006 Tsuruya
2006/0202933 A1 * 9/2006 Pasch et al. ............. 345/94

OTHER PUBLICATIONS

EPO Search Report dated Oct. 30, 2007.

* cited by examiner

Primary Examiner—Stephen W Jackson
Assistant Examiner—Zeev Kitov
(74) Attorney, Agent, or Firm—Richard D. Emery

(57) ABSTRACT

A system is presented. The system includes detection circuitry configured to detect occurrence of a zero crossing of an alternating source voltage or an alternating load current. The system also includes switching circuitry coupled to the detection circuitry and comprising a micro-electromechanical system switch. Additionally, the system includes control circuitry coupled to the detection circuitry and the switching circuitry and configured to perform arc-less switching of the micro-electromechanical system switch responsive to a detected zero crossing of an alternating source voltage or alternating load current.

27 Claims, 7 Drawing Sheets

MICRO-ELECTROMECHANICAL SYSTEM BASED SOFT SWITCHING

BACKGROUND

The invention relates generally to switching devices and more particularly to micro-electromechanical system based switching devices.

Traditionally, electromechanical contactors are employed in control gear, where the electromechanical contactors are capable of handling switching currents up to their interrupting capacity. Electromechanical contactors may also find application in power systems for switching currents. However, fault currents in power systems are typically greater than the interrupting capacity of the electromechanical contactors. Accordingly, to employ electromechanical contactors in power system applications, it may be desirable to protect the contactor from damage by backing it up with a series device that is sufficiently fast acting to interrupt fault currents prior to the contactor opening at all values of current above the interrupting capacity of the contactor.

Previously conceived solutions to facilitate use of contactors in power systems include vacuum contactors, vacuum interrupters and air break contactors, for example. Unfortunately, contactors such as vacuum contactors do not lend themselves to easy visual inspection as the contactor tips are encapsulated in a sealed, evacuated enclosure. Further, while the vacuum contactors are well suited for handling the switching of large motors, transformers and capacitors, they are known to cause damaging transient overvoltages, particularly when the load is switched off.

Furthermore, the electromechanical contactors generally use mechanical switches. However, as these mechanical switches tend to switch at a relatively slow speed, predictive techniques are required in order to estimate occurrence of a zero crossing, often tens of milliseconds before the switching event is to occur. Such zero crossing prediction is prone to error as many transients may occur in this time.

BRIEF DESCRIPTION

Briefly, in accordance with aspects of the present technique, a system is presented. The system includes detection circuitry configured to detect occurrence of a zero crossing of an alternating source voltage or an alternating load current. The system also includes switching circuitry coupled to the detection circuitry and comprising a micro-electromechanical system switch. Additionally, the system includes control circuitry coupled to the detection circuitry and the switching circuitry and configured to perform arc-less switching of the micro-electromechanical system switch responsive to a detected zero crossing of an alternating source voltage or alternating load current.

In accordance with another aspect of the present technique, a method is presented. The method includes detecting occurrence of a zero crossing of an alternating source voltage or an alternating load current. In addition, the method includes switching a present state of a micro-electromechanical system switch responsive to the detected zero-crossing such that the micro-electromechanical system switch is opened in an arc-less manner to interrupt a load circuit responsive to the detected zero crossing of the alternating load current, and the micro-electromechanical system switch is closed in an arc-less manner to complete the load circuit responsive to the detected zero crossing of the alternating source voltage.

In accordance with further aspects of the present technique a method is presented. The method includes monitoring an alternating source voltage or an alternating load current in a switch array, where the switch circuitry comprises a plurality of switch modules coupled in series. Further, the method includes detecting occurrence of zero crossing of the alternating load current or the alternating source voltage. The method also includes generating a trigger signal responsive to the detected zero crossing, where the trigger signal is configured to facilitate switching a present operating state of the micro-electromechanical system switch. In addition, the method includes switching a present state of each of the plurality of switch modules responsive to the trigger signal.

DRAWINGS

These and other features, aspects, and advantages of the present invention will become better understood when the following detailed description is read with reference to the accompanying drawings in which like characters represent like parts throughout the drawings, wherein.

Figure 2:
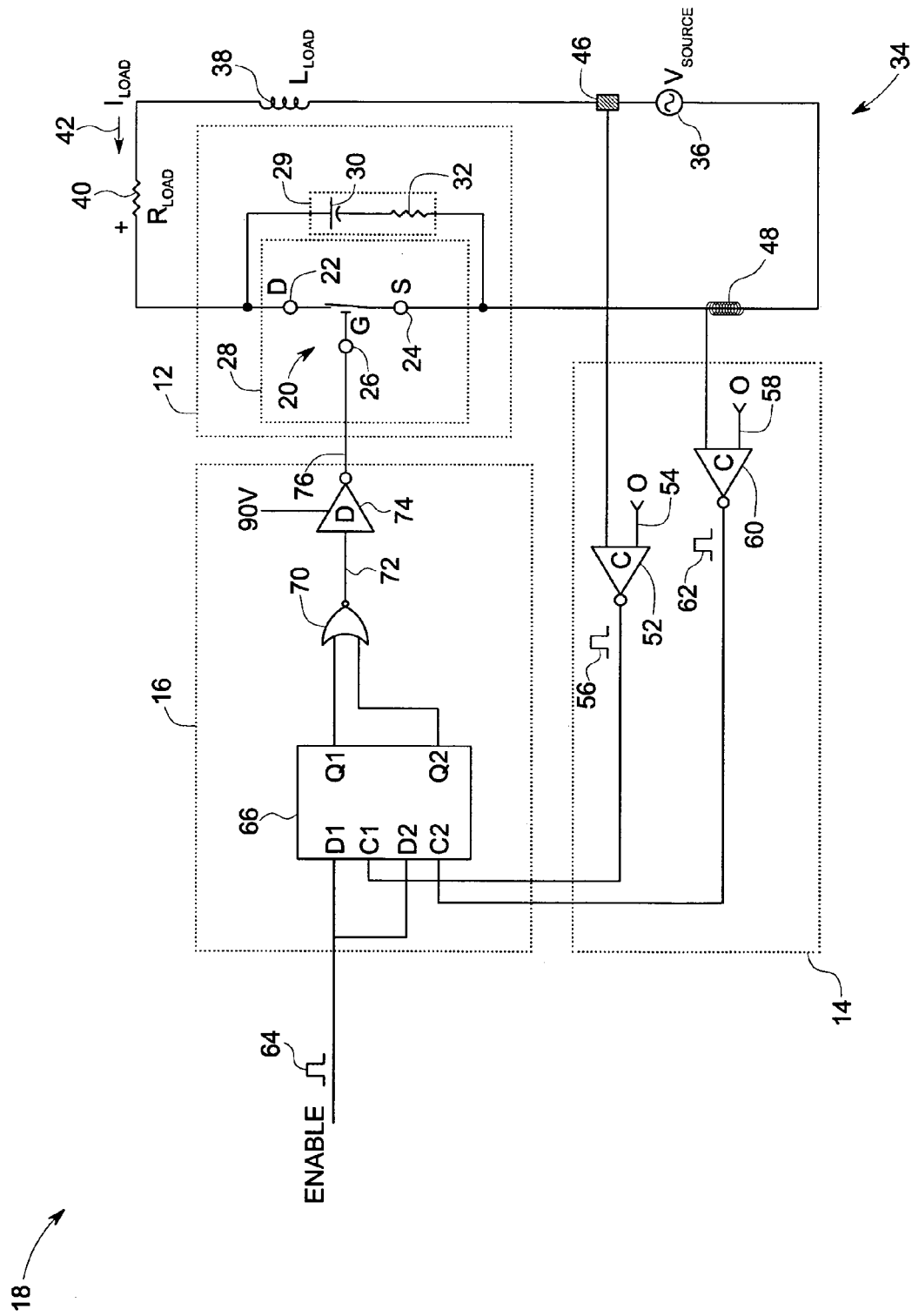
FIG. 2 is a schematic diagram illustrating an exemplary MEMS based switching system, in accordance with aspects of the present technique.
Figure 7:
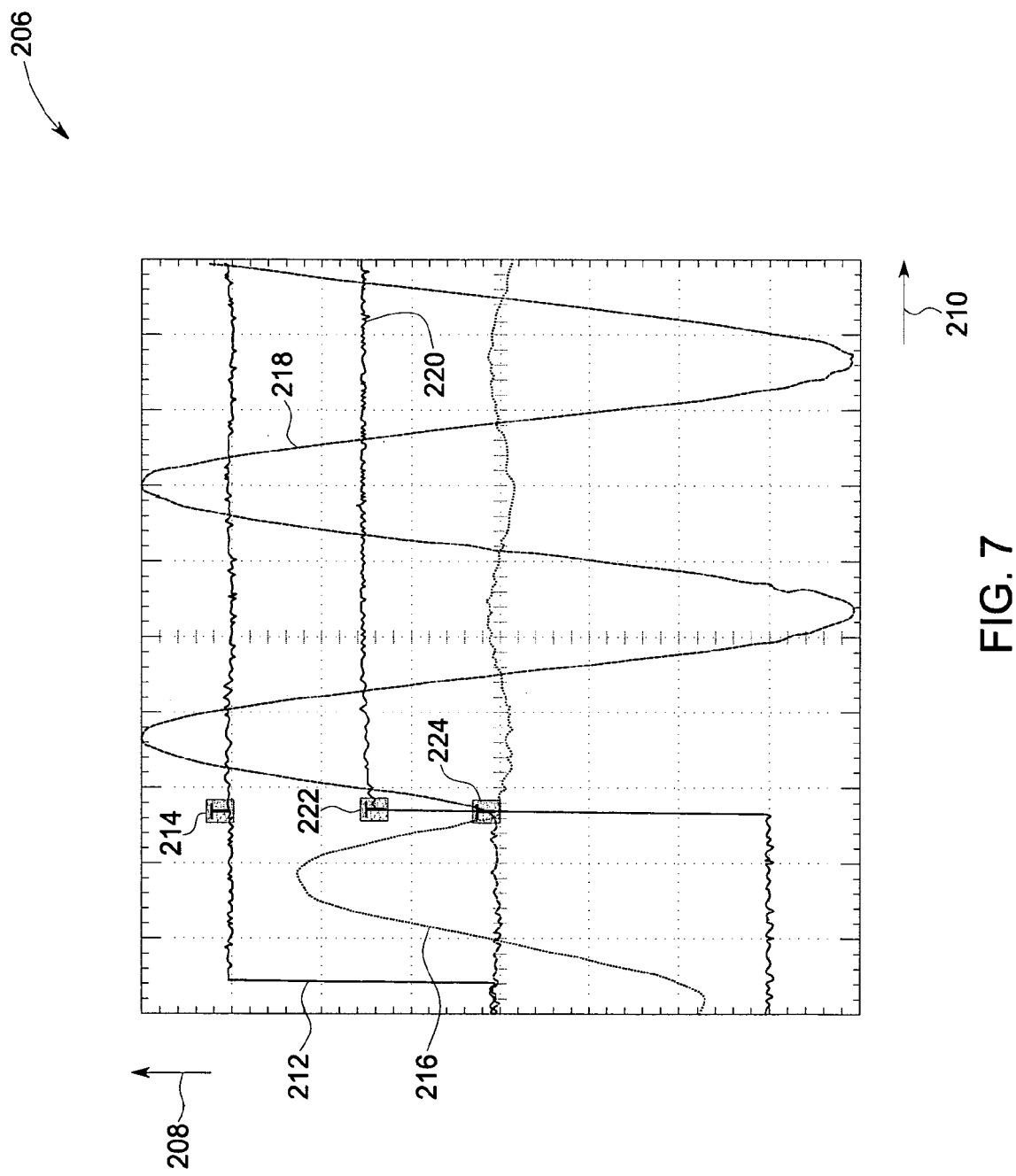
Figure 8:
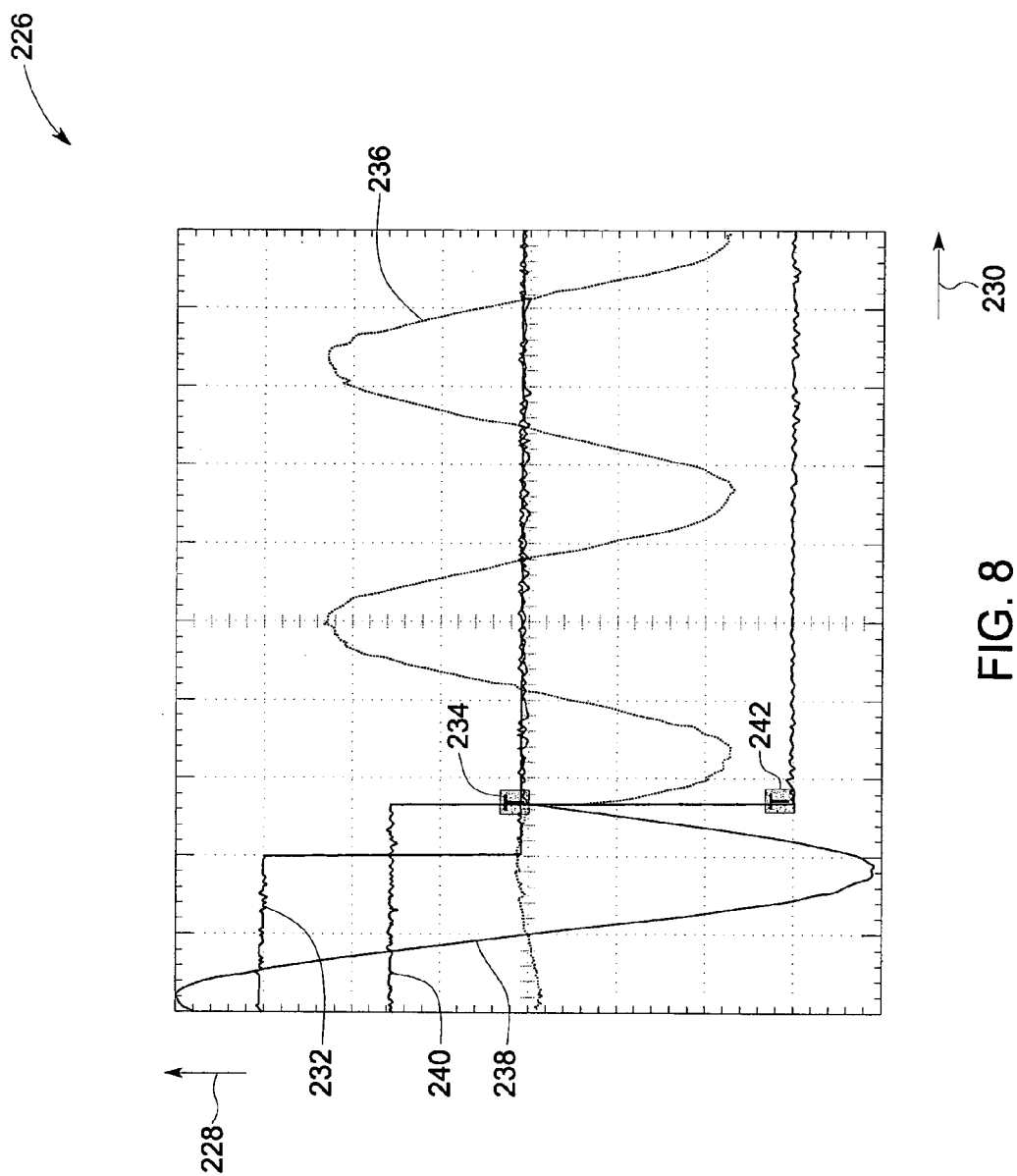

FIG. 7 is a graphical representation of exemplary simulation results representative of closing of a MEMS switch in the MEMS based switching system of FIG. 2, in accordance with aspects of the present technique; and FIG. 8 is a graphical representation of exemplary simulation results representative of opening of a MEMS switch in the MEMS based switching system of FIG. 2, in accordance with aspects of the present technique.

DETAILED DESCRIPTION

In accordance with embodiments of the present invention, systems and methods for micro-electromechanical system based arc-less switching are described herein. In the following detailed description, numerous specific details are set forth in order to provide a thorough understanding of various embodiments of the present invention. However, those skilled in the art will understand that embodiments of the present invention may be practiced without these specific details, that the present invention is not limited to the depicted embodiments, and that the present invention may be practiced in a variety of alternative embodiments. In other instances, well known methods, procedures, and components have not been described in detail.

Furthermore, various operations may be described as multiple discrete steps performed in a manner that is helpful for understanding embodiments of the present invention. However, the order of description should not be construed as to imply that these operations need be performed in the order they are presented, nor that they are even order dependent.

Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
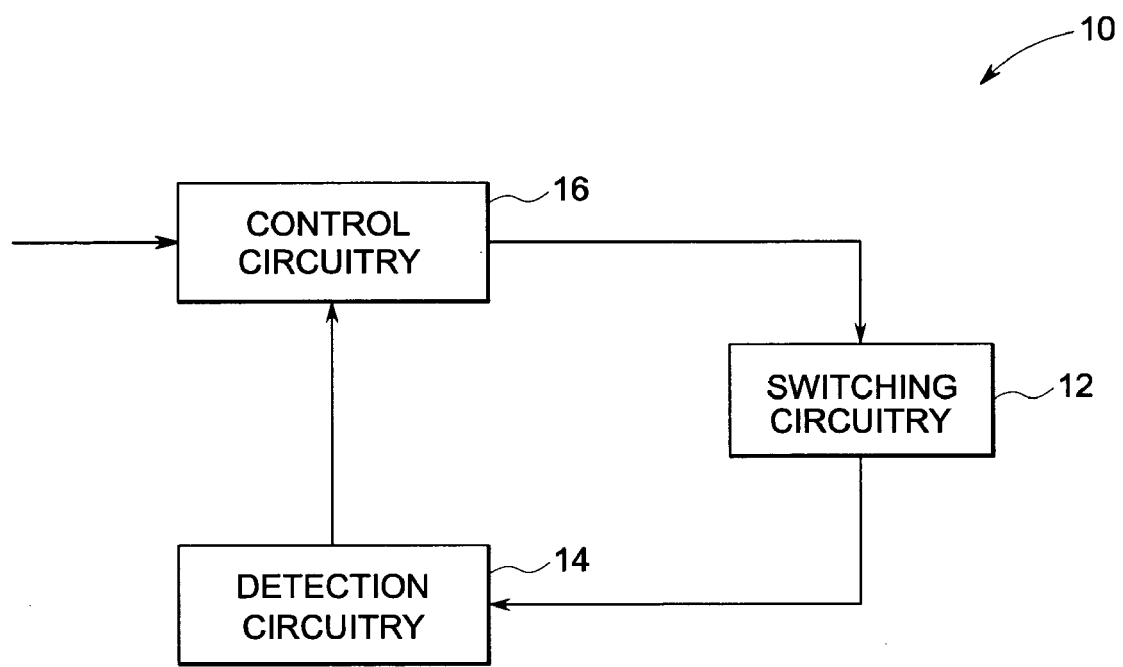
FIG. 1 is a block diagram of an exemplary MEMS based switching system, in accordance with aspects of the present technique.

FIG. 1 illustrates a block diagram of an exemplary soft switching system 10, in accordance with aspects of the present invention. As illustrated in FIG. 1, the soft switching system 10 includes switching circuitry 12, detection circuitry 14, and control circuitry 16 operatively coupled together. The detection circuitry 14 may be coupled to the switching circuitry 12 and configured to detect an occurrence of a zero crossing of an alternating source voltage in a load circuit (hereinafter "source voltage") or an alternating current in the load circuit (hereinafter referred to as "load circuit current"). The control circuitry 16 may be coupled to the switching circuitry 12 and the detection circuitry 14, and may be configured to facilitate arc-less switching of one or more switches in the switching circuitry 12 responsive to a detected zero crossing of the alternating source voltage or the alternating load circuit current. In one embodiment, the control circuitry 16 may be configured to facilitate arc-less switching of one or more MEMS switches comprising at least part of the switching circuitry 12.

In accordance with one aspect of the invention, the soft switching system 10 may be configured to perform soft or point-on-wave switching whereby one or more MEMS switches in the switching circuitry 12 may be closed at a time when the voltage across the switching circuitry 12 is at or very close to zero, and opened at a time when the current through the switching circuitry 12 is at or close to zero. By closing the switches at a time when the voltage across the switching circuitry 12 is at or very close to zero, pre-strike arcing can be avoided by keeping the electric field low between the contacts of the one or more MEMS switches as they close, even if multiple switches do not all close at the same time. Similarly, by opening the switches at a time when the current through the switching circuitry 12 is at or close to zero, the soft switching system 10 can be designed so that the current in the last switch to open in the switching circuitry 12 falls within the design capability of the switch. As alluded to above and in accordance with one embodiment, the control circuitry 16 may be configured to synchronize the opening and closing of the one or more MEMS switches of the switching circuitry 12 with the occurrence of a zero crossing of an alternating source voltage or an alternating load circuit current.

Turning to FIG. 2, a schematic diagram 18 of one embodiment of the soft switching system 10 of FIG. 1 is illustrated. In accordance with the illustrated embodiment, the schematic diagram 18 includes one example of the switching circuitry 12, the detection circuitry 14 and the control circuitry 16.

Although for the purposes of description FIG. 2 only illustrates a single MEMS switch 20, the switching circuitry 12 may nonetheless include multiple MEMS switches depending upon e.g., the current and voltage handling requirements of the soft switching system 10. In one embodiment, the switching circuitry 12 may include a switch module including multiple MEMS switches coupled together in a parallel configuration to divide the current amongst the MEMS switches. In another embodiment, the switching circuitry 12 may include an array of MEMS switches coupled in a series configuration to divide the voltage amongst the MEMS switches. In yet a further embodiment, the switching circuitry 12 may include an array of MEMS switch modules coupled together in a series configuration to concurrently divide the voltage amongst the MEMS switch modules and divide the current amongst the MEMS switches in each module. In one embodiment, the one or more MEMS switches of the switching circuitry 12 may be integrated into a single package 28.

The exemplary MEMS switch 20 may include three contacts. In one embodiment, a first contact may be configured as a drain 22, a second contact may be configured as a source 24, and the third contact may be configured as a gate 26. In one embodiment, the control circuitry 16 may be coupled to the gate contact 26 to facilitate switching a current state of the MEMS switch 20. Also, in certain embodiments, damping circuitry 29 may be coupled in parallel with the MEMS switch 20 to delay appearance of voltage across the MEMS switch 20. As illustrated, the damping circuitry 29 may include a snubber capacitor 30 coupled in series with a snubber resistor 32, for example.

Additionally, the MEMS switch 20 may be coupled in series with a load circuit 34 as further illustrated in FIG. 2. In a presently contemplated configuration, the load circuit 34 may include a voltage source $V_{SOURCE}$ 36, and may possess a representative load inductance $L_{LOAD}$ 38 and a load resistance $R_{LOAD}$ 40. In one embodiment, the voltage source $V_{SOURCE}$ 36 (also referred to as an AC voltage source) may be configured to generate the alternating source voltage and the alternating load current $I_{LOAD}$ 42.

As previously noted, the detection circuitry 14 may be configured to detect occurrence of a zero crossing of the alternating source voltage or the alternating load current $I_{LOAD}$ 42 in the load circuit 34. The alternating source voltage may be sensed via the voltage sensing circuitry 46 and the alternating load current $I_{LOAD}$ 42 may be sensed via the current sensing circuitry 48. The alternating source voltage and the alternating load current may be sensed continuously or at discrete periods for example.

A zero crossing of the source voltage may be detected through e.g., use of a comparator such as the illustrated zero voltage comparator 52. The voltage sensed by the voltage sensing circuitry 46 and a zero voltage reference 54 may be employed as inputs to the zero voltage comparator 52. In turn, an output signal 56 representative of a zero crossing of the source voltage of the load circuit 34 may be generated. Similarly, a zero crossing of the load current LOAD 42 may also be detected through use of a comparator such as the illustrated zero current comparator 60. The current sensed by the current sensing circuitry 48 and a zero current reference 58 may be employed as inputs to the zero current comparator 60. In turn, an output signal 62 representative of a zero crossing of the load current $I_{LOAD}$ 42 may be generated.

The control circuitry 16, may in turn utilize the output signals 56 and 62 to determine when to change (e.g., open or close) the current operating state of the MEMS switch 20 (or array of MEMS switches). More specifically, the control circuitry 16 may be configured to facilitate opening of the MEMS switch 20 in an arc-less manner to interrupt or open the load circuit 34 responsive to a detected zero crossing of the alternating load current $I_{LOAD}$ 42. Additionally, the control circuitry 16 may be configured to facilitate closing of the MEMS switch 20 in an arc-less manner to complete the load circuit 34 responsive to a detected zero crossing of the alternating source voltage.

In one embodiment, the control circuitry 16 may determine whether to switch the present operating state of the MEMS switch 20 to a second operating state based at least in part upon a state of an Enable signal 64. The Enable signal 64 may be generated as a result of a power off command in a contactor application, for example. In one embodiment, the Enable signal 64 and the output signals 56 and 62 may be used as input signals to a dual D flip-flop 66 as shown. As will be described in further detail with respect to FIGS. 7-8, these signals may be used to close the MEMS switch 20 at a first source voltage zero after the Enable signal 64 is made active (e.g., rising edge triggered), and to open the MEMS switch 20 at the first load current zero after the Enable signal 64 is deactivated (e.g., falling edge triggered). With respect to the illustrated schematic diagram 18 of FIG. 2, every time the Enable signal 64 is active (either high or low depending upon the specific implementation) and either output signal 56 or 62 indicates a sensed voltage or current zero, a trigger signal 72 may be generated. In one embodiment, the trigger signal 72 may be generated via a NOR gate 70, for example. The trigger signal 72 may in turn be passed through a MEMS gate driver 74 to generate a gate activation signal 76 which may be used to apply a control voltage to the gate 26 of the MEMS switch 20 (or gates in the case of a MEMS array).

As previously noted, in order to achieve a desirable current rating for a particular application, a plurality of MEMS switches may be operatively coupled in parallel (e.g., to form a switch module) in lieu of a single MEMS switch. The combined capabilities of the MEMS switches may be designed to adequately carry the continuous and transient overload current levels that may be experienced by the load circuit. For example, with a 10-amp RMS motor contactor with a 6× transient overload, there should be enough switches coupled in parallel to carry 60 amps RMS for 10 seconds. Using point-on-wave switching to switch the MEMS switches within 5 microseconds of reaching current zero, there will be 160 milliamps instantaneous, flowing at contact opening. Thus, for that application, each MEMS switch should be capable of "warm-switching" 160 milliamps, and enough of them should be placed in parallel to carry 60 amps. On the other hand, a single MEMS switch should be capable of interrupting the amount of current that will be flowing at the moment of switching.

Figure 3:
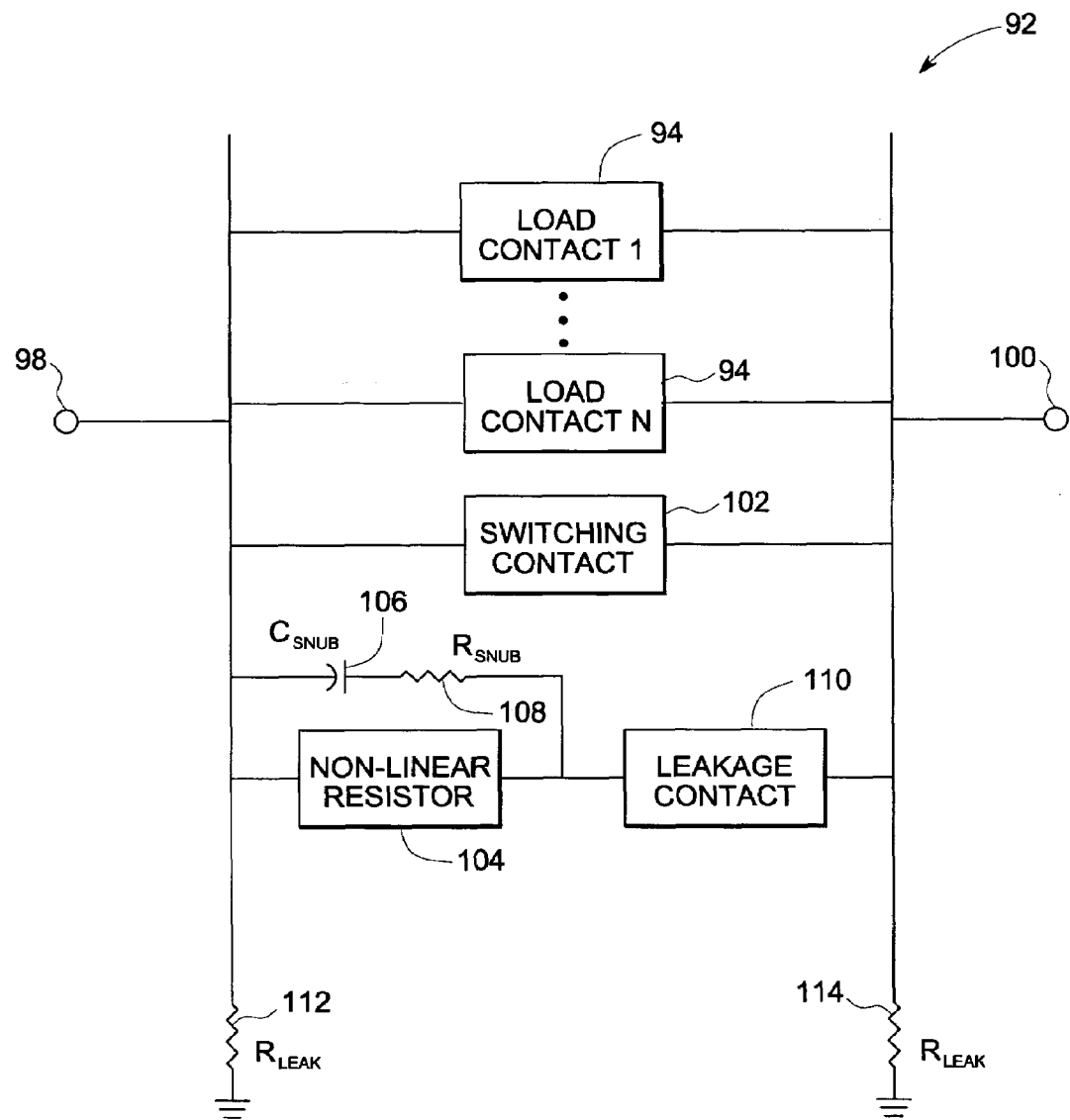
FIG. 3 is a schematic diagram illustrating an exemplary MEMS based switch module, in accordance with aspects of the present technique.

FIG. 3 illustrates a schematic diagram of one embodiment of a MEMS based switch module 92. As illustrated, the switch module 92 may include a plurality of MEMS switches operatively coupled in parallel between leads 98 and 100. In one embodiment, the plurality of MEMS switches in the switch module 92 may include one or more load contacts 94. In accordance with one embodiment, control circuitry 16 (see FIG. 1) may generate one or more signals to cause the plurality of load contacts 94 to initiate opening or closing at substantially the same time. Due to slight variations in design between the load contacts 94, it is quite likely that not all of load contacts will open or close simultaneously. As such, there will likely be one load contact that is the last to switch and thus carry the entire current of the switch module 92 for a brief period of time (e.g., on the order of a few microseconds). The load contacts 94 may thus be designed to be relatively small and still handle the steady state load current $I_{LOAD}$ 42 (see FIG. 2) of the load circuit 34 (see FIG. 2), which is also rather small (e.g., on the order of about 50 mA to about 1 Ampere).

The last switch in the switch module 92 to open, however, may be called upon to interrupt from about 10 mA to 100 mA depending upon the design of the switch array and the switching controls. In one embodiment, it may be desirable to employ a switching contact 102 in addition to the one or more load contacts 94 to facilitate final interruption of the load current in the switch module 92. The switching contact 102 may be designed to handle a larger current than the load contacts 94. Although the increased current carrying capability of the switching contact 102 may require that the switching contact be larger than the load contacts 94, a fewer number of switching contacts 102 may be used.

Also, in certain embodiments, a non-linear resistor 104, such as a varistor, may be employed to absorb any residual inductive energy from the switch module 92. The non-linear resistor 104 may include a metal oxide varistor (MOV), for example. Such a non-linear resistor 104 may be included in the design of the switch module 92 so as to clip the peaks of the recovery voltage and/or absorb any residual inductive energy from the load circuit. The MOV may be selected based on peak voltage, peak current, and energy absorption characteristics. In certain embodiments, the peak voltage of the load circuit may be set to approximately 1.6 times the peak of the steady-state voltage rating. The 1.6 factor helps control the amount of energy absorbed by the MOV. The current rating may be set to the peak current that is expected to be flowing when the contacts open.

In addition, the switch module 92 may include a snubber circuit coupled across the non-linear resistor 104. The snubber circuit may include a snubber capacitor $C_{SNUB}$ 106 coupled in series with a snubber resistor $R_{SNUB}$ 108. The snubber capacitor $C_{SNUB}$ 106 may facilitate improvement in transient voltage sharing during the sequencing of the opening of the MEMS switches. Furthermore, the snubber resistor 108 may suppress any pulse of current generated by the snubber capacitor $C_{SNUB}$ 106 during closing operation of the switch module 92. Additionally, the switch module 92 may include a leakage contact 110 coupled in series with the non-linear resistor 104. It may be noted that the leakage contact 110 may include a MEMS switch. This leakage contact 110 may be configured to reduce steady state leakage current through the switch module 92 by removing the effect of any capacitive and non-linear resistive elements (e.g., such as non-linear resistor 104, $C_{SNUB}$ 106 and $R_{SNUB}$ 108) from the switch module 92. The switch module 92 may also include one or more leakage resistors 112, 114, where the leakage resistors 112, 114 may be configured to provide a conductive path for any leakage current in the switch module 92.

Figure 4:
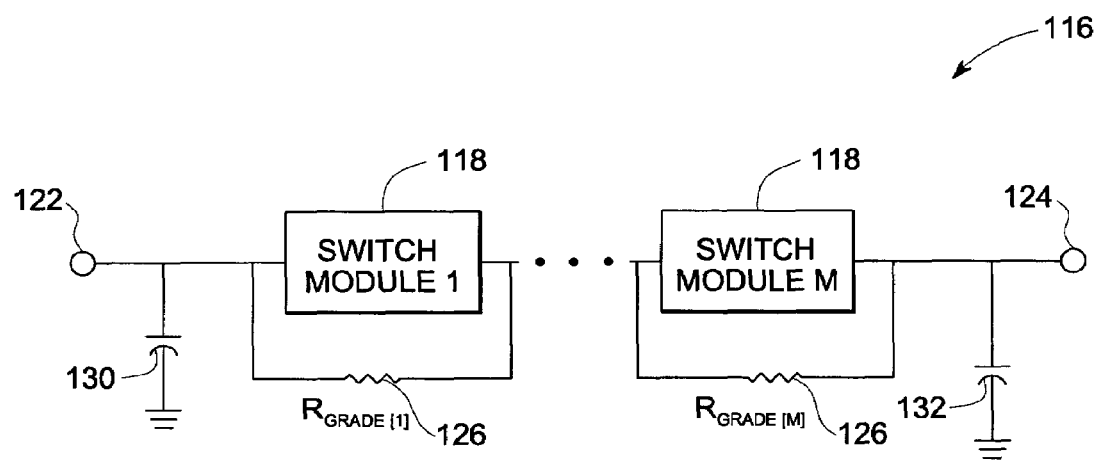
FIG. 4 is a schematic diagram illustrating an exemplary MEMS based switch array, in accordance with aspects of the present technique.

Just as a plurality of MEMS switches may be operatively coupled in parallel to form a switch module to achieve a desirable current rating, a plurality of MEMS switches or switch modules may be operatively coupled in series to achieve a desirable voltage rating. FIG. 4 is a schematic diagram illustrating an exemplary MEMS based switch array 116 in accordance with one embodiment. As illustrated in FIG. 4, the switch array 116 may include a plurality of switch modules 118 operatively coupled in series. It may be noted that each of the plurality of switch modules 118 may include at least one MEMS switch. In one embodiment, one or more of switch modules 118 may represent the switch module 92 of FIG. 3. In a presently contemplated configuration, the switch array 116 is shown as including two or more switch modules 118 operatively coupled in series between leads 122 and 124. The number 'M' of modules to be coupled in series may be determined by the peak voltage rating for the soft switching system 10 (see FIG. 1).

Furthermore, each of the plurality of switch modules 118 may include a respective grading resistor $R_{GRADE}$ 126 coupled across each of the plurality of switch modules 118. The grading resistor(s) $R_{GRADE}$ 126 may provide a conductive path for steady state voltage grading in the face of a very slight leakage current to ground. More specifically, in the switch array 116 leakage currents from MEMS switches to ground may result in a very uneven voltage distribution when all the MEMS switches are open. Steady state voltage sharing may be accomplished via the grading resistor(s) $R_{GRADE}$ 126, which allow a fraction of a microampere to flow through the switch array 116 to force an even voltage distribution in the face of leakage current to ground. The grading resistor(s) $R_{GRADE}$ 126 may be selected based on the line to ground leakage currents expected through the MEMS switches. Additionally, the switch array 116 may also include capacitors 130, 132 configured to facilitate controlling rate of rise of recovery voltage.

Figure 5:
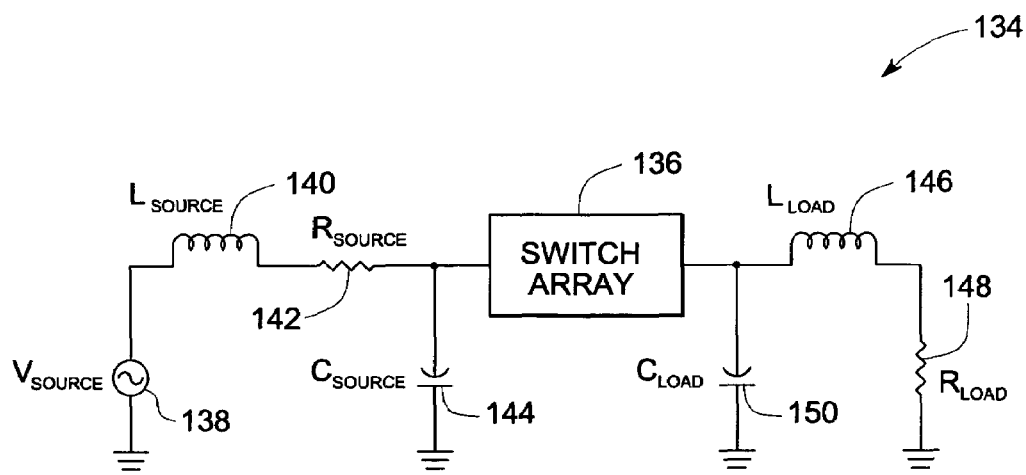
FIG. 5 is a schematic diagram illustrating a system model of the exemplary MEMS based switching system, in accordance with aspects of the present technique.

Referring now to FIG. 5, a schematic diagram 134 of a system model of the exemplary MEMS based switching system is illustrated. The exemplary MEMS based switching system 134 is shown as including a switch array 136, such as the switch array 116 of FIG. 4. As shown, the MEMS based switching system 134 includes an alternating current (AC) voltage source $V_{SOURCE}$ 138, a source inductance $L_{SOURCE}$ 140, and a source resistance $R_{SOURCE}$ 142. The AC voltage source 138, a source inductance $L_{SOURCE}$ 140, and a source resistance $R_{SOURCE}$ 142 may be representative of the Thevenin equivalent circuit of the power source that can arise from e.g., the secondary of a transformer in the delivery of power to the switch array 136. Furthermore, the source inductance $L_{SOURCE}$ 140 may be representative of a combined inductance of buses and cables viewed by the switch array 136.

In addition, the MEMS based switching system 134 is shown as including a passive load, where the passive load may include a load inductance $L_{LOAD}$ 146 coupled in series with a load resistance $R_{LOAD}$ 148. The MEMS based switching system 134 may also include a source capacitor $C_{SOURCE}$ 144 and a load capacitor $C_{LOAD}$ 150. The source ($C_{SOURCE}$ 144) and load ($C_{LOAD}$ 150) capacitors may control the rate of rise of the recovery voltage across the switch array 136. Without such source and load capacitors, there is a possibility of arcing in the switch array 136 during interruption of an inductive load current. It may be noted that the source capacitor $C_{SOURCE}$ 144 and load capacitor $C_{LOAD}$ 150 may be coupled from line to ground rather than directly across the switch array 136 to suppress a capacitive leakage current through the switch array 136 when in an open or non-conducting state. Additionally, the source ($C_{SOURCE}$ 144) and load ($C_{LOAD}$ 150) capacitors may facilitate reducing voltage stress on the switch array 136 during load interruption.

Figure 6:
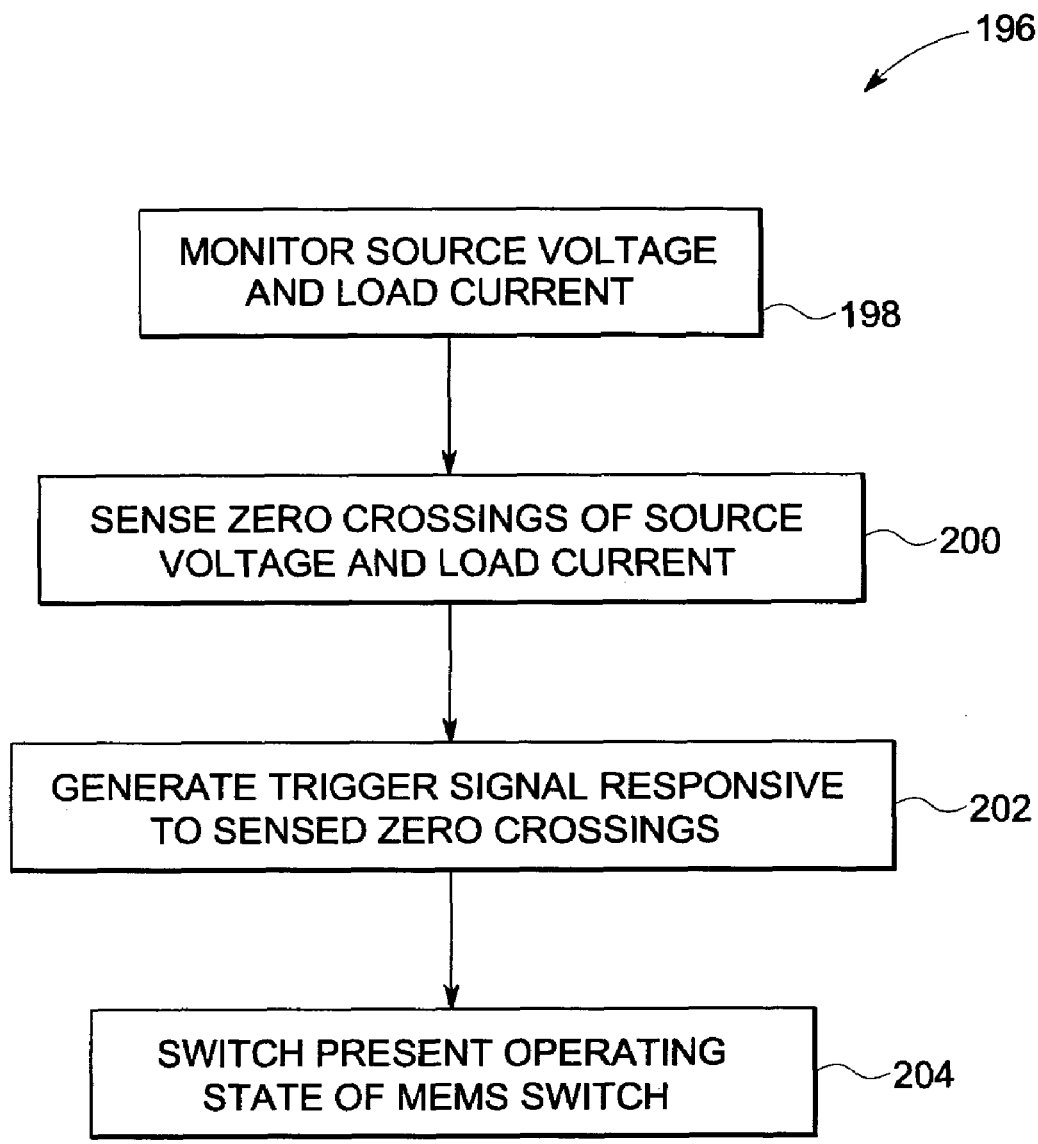
FIG. 6 is a flow chart depicting steps of operating the exemplary MEMS based switching system, in accordance with aspects of the present technique.

Turning now to FIG. 6, a flow chart 196 illustrating one embodiment of a method for switching an exemplary MEMS based soft switching system from a present operating state to a second state is provided. As previously noted, detection circuitry and control circuitry may be operatively coupled to the switching circuitry, where the detection circuitry may be configured to detect a zero crossing of the AC source voltage or a AC load current, and the control circuitry may be configured to facilitate arc-less switching of the MEMS switches responsive to the detected zero crossing.

As illustrated in FIG. 6, a current level and/or a source voltage level in a load circuit may be monitored as indicated by block 198. In one embodiment, the current level and/or a source voltage level may be monitored via the detection circuitry 14 (see FIG. 1), for example. Additionally, as indicated by block 200, zero crossings of source voltage and the load current may be sensed by the detection circuitry, for example. A trigger signal may be generated responsive to the detected zero crossings as indicated by block 202. The trigger signal may be configured to facilitate switching of a present operating state of the MEMS switch as indicated by block 204.

Blocks 198-204 may be better understood with reference to FIGS. 7 and 8. FIG. 7 is a graphical representation 206 of exemplary simulation results representative of a MEMS switch closing at near zero voltage in a MEMS based soft switching system, in accordance with aspects of the present invention. As depicted in FIG. 7, a variation in amplitude 208 is plotted against a variation in time 210.

Response curve 212 represents a variation of amplitude of the Enable signal voltage as a function of time. Also, reference numeral 214 represents region on the response curve 212 where the Enable signal voltage has reached a steady logic high state. A variation of amplitude of the source voltage as a function of time is represented in response curve 216. In a similar fashion, a variation of amplitude of the load current as a function of time is embodied in response curve 218. Response curve 220 represents a variation of amplitude of the gate voltage as a function of time. Also, a region on the response curve 220 where the gate voltage is transitioned to a logic high state is indicated by reference numeral 222. Furthermore, reference numeral 224 represents a zero crossing of the source voltage.

As previously described with reference to FIG. 2, the source voltage and load current are continuously sensed via the detection circuitry. Furthermore, the detection circuitry is employed to detect zero crossings of the source voltage and the load current. This information regarding the detected zero crossings is then employed to set the state of the Enable signal. In the illustrated embodiment depicted by FIG. 7, the Enable voltage 212 is set to a logic high state in response to a detected zero crossing of the source voltage. Furthermore, the voltage of the Enable signal 212 is illustrated as achieving a steady high state at reference point 214.

In accordance with exemplary aspects of the present invention, the MEMS switch may be closed at a first zero crossing of the source voltage after the Enable signal voltage achieves a steady logic high state. The first zero crossing of the source voltage 216 after the Enable signal 212 achieves a steady logic high state is represented by reference numeral 224. At the instant in time associated with the first source voltage zero crossing 224, the gate voltage 220 may be pulled high to facilitate switching the MEMS switch to a closed state. As a result, the load current starts to flow through the MEMS switch as indicated by response curve 218. Consequently, the MEMS switch is closed in an arc-less manner to complete the load circuit responsive to the detected zero crossing of the AC source voltage. In other words, the MEMS switch is closed at a near zero source voltage, thereby suppressing any arc that may be formed between the contacts of the MEMS switch.

FIG. 8 is a graphical representation 226 of exemplary simulation results representative of a MEMS switch opening at near zero current in a MEMS based soft switching system, in accordance with aspects of the present invention. As depicted in FIG. 8, a variation in amplitude 228 is plotted against a variation in time 230.

Response curve 232 represents a variation of amplitude of the Enable voltage as a function of time. Also, reference numeral 234 represents a region on the response curve 232 where the Enable signal has reached a steady logic low state. A variation of amplitude of the source voltage as a function of time is represented in response curve 236. In a similar fashion, a variation of amplitude of the load current as a function of time is embodied in response curve 238. Response curve 240 represents a variation of amplitude of the gate voltage as a function of time. Furthermore, reference numeral 242 represents a region on the response curve 242 where the gate voltage is transitioned to a logic low state.

As can be seen from FIG. 8, the voltage of the Enable signal 232 that is currently in a logic high state is set to a logic low state in response to a detected zero crossing of the toad current. Furthermore, the voltage of the Enable signal 232 is illustrated as achieving the logic low state at reference point 234.

The MEMS switch may be opened at a first zero crossing of the load current after the Enable signal achieves a steady logic low state. The first zero crossing of the load current 238 after the Enable signal 232 achieves a steady low state is also represented by reference numeral 234. At the instant in time associated with the first load current zero crossing 234, the gate voltage 240 may be pulled low to facilitate switching the MEMS switch to an open state. Consequently, the source voltage that was previously in a non-conducting state begins to appear across the MEMS switch as indicated by response curve 236. Consequently, the MEMS switch is opened in an arc-less manner to interrupt a load circuit responsive to the detected zero crossing of the AC load current. In other words, the MEMS switch is opened at a near zero load current, thereby suppressing any arc that may be formed between the contacts of the MEMS switch.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
    detection circuitry configured to detect occurrence of a zero crossing of an alternating source voltage or an alternating load current;
    switching circuitry coupled to the detection circuitry and comprising a micro-electromechanical system switch; and
    control circuitry coupled to the detection circuitry and the switching circuitry and configured to receive an Enable signal, and, when closed, to open the micro-electromechanical system switch at a first detected zero crossing of the source voltage or the load current after receipt of the Enable signal, and, when open, to close the micro-electromechanical system switch at a first detected zero crossing of the source voltage or the load current after receipt of the Enable signal.

2. The system of claim 1, wherein the control circuitry is configured to open the micro-electromechanical system switch at the first detected zero crossing of the alternating load current after receipt of the Enable signal.

3. The system of claim 1, wherein the control circuitry is configured to close the micro-electromechanical system switch at the first detected zero crossing of the alternating source voltage after receipt of the Enable signal.

4. The system of claim 1, further comprising a source of current coupled in series with the micro-electromechanical system switch to generate the alternating source voltage and the alternating load current.

5. The system of claim 1, further comprising a snubbing circuit configured to delay appearance of voltage across the micro-electromechanical system switch.

6. The system of claim 5, wherein the snubbing circuit comprises a resistor and a capacitor coupled in series.

7. The system of claim 1, wherein the switching circuitry further comprises a switch module coupled to the control circuitry and the detection circuitry and comprising a plurality of micro-electromechanical system switches, wherein the control circuitry is configured to perform arc-less switching of at least one of the plurality of micro-electromechanical system switches responsive to a detected zero crossing of an alternating source voltage or alternating load current.

8. The system of claim 1, wherein the switching circuitry further comprises a plurality of switch modules coupled in a series circuit.

9. The system of claim 8, further comprising a grading resistor coupled in parallel with at least one switch module.

10. The system of claim 8, wherein at least one of the plurality of switch modules comprises:
    a load contact; and
    a switching contact, wherein at least one of the load and switching contacts comprise a micro-electromechanical system switch.

11. The system of claim 10, wherein at least one of the plurality of switch modules comprises a damping circuit configured to delay the appearance of a voltage across the at least one switch module.

12. The system of claim 11, wherein the damping circuit comprises a non-linear resistor configured to facilitate absorbing inductive energy in at least one micro-electromechanical system switch.

13. The system of claim 12, further comprising a leakage contact to suppress a leakage current through at least one of the plurality of switch modules, wherein the leakage contact comprises a micro-electromechanical system switch.

14. The system of claim 1, wherein the switching circuitry further comprises a plurality of micro-electromechanical system switches coupled in a series circuit, wherein the control circuitry is configured to perform arc-less switching of the plurality of micro-electromechanical system switches responsive to a detected zero crossing of an alternating source voltage or alternating load current.

15. The system of claim 14, further comprising a grading resistor coupled in parallel with at least one switch module.

16. A method comprising:
    detecting occurrence of a first zero crossing of an alternating source voltage or an alternating load current, wherein the first zero crossing is the first zero crossing event detected after a prior receipt of an Enable signal; and
    switching a present state of a micro-electromechanical system switch at the detection of the detected first zero-crossing such that
    the micro-electromechanical system switch is opened in an arc-less manner to interrupt a load circuit responsive to the detected zero crossing of the alternating load current, and
    the micro-electromechanical system switch is closed in an arc-less manner to complete the load circuit responsive to the detected zero crossing of the alternating source voltage.

17. The method of claim 16, further comprising sensing the alternating load current and source voltage.

18. The method of claim 17, further comprising generating a trigger signal responsive to at least one of the alternating load current and source voltage, wherein the trigger signal initiates opening or closing the micro-electromechanical system switch.

19. The method of claim 16, further comprising suppressing a voltage across the micro-electromechanical switch via voltage clamping circuitry.

20. A method comprising:
    monitoring an alternating source voltage or an alternating load current in a switch circuitry, wherein the switch circuitry comprises a plurality of switch modules coupled in series, wherein the switch circuitry further comprising a micro-electromechanical system switch;
    detecting occurrence of a first zero crossing of the alternating load current or the alternating source voltage, wherein the first zero crossing is the first zero crossing event detected after a prior receipt of an Enable signal;
    generating a trigger signal at the detection of the detected first zero crossing, wherein the trigger signal is configured to activate switching a present operating state of the micro-electromechanical system switch; and switching a present state of each of the plurality of switch modules immediately responsive to the trigger signal.

21. The method of claim 20, wherein at least one of the plurality of switch modules comprises:

a load contact; and a switching contact, wherein at least one of the load and switching contacts comprise a micro-electromechanical system switch.

22. The method of claim 21, wherein switching the present state comprises:

triggering the load contact and the at least one switching contact such that the load contact is triggered prior to the at least one switching contact;

opening the load contact and the at least one switching contact in an arc-less manner to interrupt a non-zero current in the switching circuitry such that the plurality load contact is opened prior to the at least one switching contact; and closing the load contact and the at least one switching contact in an arc-less manner to complete the switching circuit while a non-zero voltage appears across the switch.

23. The method of claim 20, wherein the trigger signals are configured to facilitate synchronizing switching the present state of each of the plurality of load contacts and the at least one switching contact.

24. The method of claim 20, further comprising suppressing a voltage across each of the plurality of switch modules via voltage clamping circuitry.

25. The method of claim 20, further comprising delaying appearance of a voltage across the at least one switch module comprises via a damping circuit.

26. The method of claim 25, comprising absorbing inductive energy in at least one micro-electromechanical system switch.

27. The method of claim 25, further comprising suppressing leakage current through at least one of the plurality of switch modules.

* * * * *

UNITED STATES PATENT AND TRADEMARK OFFICE
CERTIFICATE OF CORRECTION

PATENT NO. : 7,633,725 B2  Page 1 of 1
APPLICATION NO. : 11/314879
DATED : December 15, 2009
INVENTOR(S) : Premerlani et al.

It is certified that error appears in the above-identified patent and that said Letters Patent is hereby corrected as shown below:

In Column 4, Line 40, delete "LOAD" and insert -- $I_{LOAD}$ --, therefor.

In Column 8, Line 62, delete "toad" and insert -- load --, therefor.

In Column 10, Line 40, in Claim 16, after "detected" insert -- first --.

In Column 10, Line 44, in Claim 16, after "detected" insert -- first --.

Signed and Sealed this

Twenty-third Day of February, 2010

David J. Kappos
*Director of the United States Patent and Trademark Office*